(12) United States Patent
Wadsworth et al.

(10) Patent No.: US 6,528,106 B2
(45) Date of Patent: Mar. 4, 2003

(54) *MORINDA CITRIFOLIA* DIETARY FIBER

(75) Inventors: John J. Wadsworth, Orem, UT (US); Stephen P. Story, Alpine, UT (US); C. Jarakae Jensen, Cedar Hills, UT (US)

(73) Assignee: Morinda, Inc., Provo, UT (US)

( * ) Notice: Subject to any disclaimer, the term of this patent is extended or adjusted under 35 U.S.C. 154(b) by 0 days.

(21) Appl. No.: 09/829,039

(22) Filed: Apr. 9, 2001

(65) Prior Publication Data

US 2001/0046550 A1 Nov. 29, 2001

Related U.S. Application Data

(63) Continuation of application No. 09/384,784, filed on Aug. 27, 1999, now Pat. No. 6,254,913.

(51) Int. Cl.$^7$ .................. A23L 1/212; A23L 1/2165
(52) U.S. Cl. .................. 426/615; 426/52; 426/478; 426/481; 426/489; 426/521; 424/195.1
(58) Field of Search .................. 426/615, 52, 521, 426/478, 481, 489; 424/195.1

(56) References Cited

U.S. PATENT DOCUMENTS

| | | | |
|---|---|---|---|
| 4,409,144 A | 10/1983 | Heinicke | 260/236 |
| 4,543,212 A | 9/1985 | Heinicke | 546/1 |
| 4,666,606 A | 5/1987 | Heinicke | 210/632 |
| 4,948,785 A | 8/1990 | Nguyen | 514/54 |
| 4,996,051 A | * 2/1991 | Meer et al. | 426/615 |
| 5,110,803 A | 5/1992 | Nguyen | 514/54 |
| 5,268,467 A | 12/1993 | Verbiscar | 536/123 |
| 5,275,834 A | 1/1994 | Thibault et al. | 426/577 |
| 5,288,491 A | * 2/1994 | Moniz | 424/195.1 |
| 5,744,187 A | * 4/1998 | Gaynor | 426/599 |

* cited by examiner

*Primary Examiner*—Helen Pratt
(74) *Attorney, Agent, or Firm*—Kirton & McConkie; Michael F. Krieger

(57) ABSTRACT

A dietary fiber product obtained from the Indian mulberry (*Morinda citrifolia*) plant and the process of extracting and purifying the fiber is disclosed. According to one embodiment, the Indian mulberry pulp is washed and separated from the juice by filtration. The wet pulp is pasteurized. The wet pulp can be further processed by drying. A high fiber products can be prepared by mixing the pulp with ingredients, such as supplemental dietary fiber, water, sweeteners, flavoring agents, coloring agents, and nutritional ingredients.

22 Claims, No Drawings

*MORINDA CITRIFOLIA* DIETARY FIBER

RELATED APPLICATION

The present application is related to and is a contiuation of and claims priority to U.S. application Ser. No. 09/384,784, filed Aug. 27, 1999, now U.S. Pat. No. 6,254,913, which is incorporated by reference of all purposes.

FIELD OF THE INVENTION

The present invention relates to dietary fiber obtained from the *Morinda citrifolia* plant and to the process of extracting and purifying the fiber.

BACKGROUND OF INVENTION

The Indian Mulberry plant, known scientifically as *Morinda citrifolia* L., is a shrub, or small or medium sized tree 3 to 10 meters high. It grows in tropical coastal regions around the world. The plant grows randomly in the wild, and it has been cultivated in plantations and small individual growing plots. The Indian mulberry plant has somewhat rounded branches and evergreen, opposite (or spuriously alternate), dark, glossy, wavy, prominently-veined leaves. The leaves are broadly elliptic to oblong, pointed at both ends, 10–30 cm in length and 5–15 cm wide.

The Indian mulberry flowers are small, white, 3 to 5 lobed, tubular, fragrant, and about 1.25 cm long. The flowers develop into compound fruits composed of many small drupes fused into an ovoid, ellipsoid or roundish, lumpy body, 5–10 cm long, 5–7 cm thick, with waxy, white or greenish-white or yellowish, semi-translucent skin. The fruit contains "eyes" on its surface, similar to a potato. The fruit is juicy, bitter, dull-yellow or yellowish-white, and contains numerous red-brown, hard, oblong-triangular, winged, 2-celled stones, each containing about 4 seeds.

When fully ripe, the fruit has a pronounced odor like rancid cheese. Although the fruit has been eaten by several nationalities as food, the most common use of the Indian mulberry plant was as a red and yellow dye source. Recently, there has been an interest in the nutritional and health benefits of the Indian mulberry plant.

It would be a significant advancement in the art to provide dietary fiber from the Indian mulberry plant and to provide a process for obtaining the dietary fiber extracted from the Indian mulberry plant.

SUMMARY OF THE INVENTION

The present invention is directed to a method of obtaining *Morinda citrifolia* dietary fiber and to products containing the fiber. In one currently preferred embodiment of the method, a quantity of *Morinda citrifolia* juice and pulp is obtained. The wet pulp is filtered from the juice, wherein the wet pulp has a fiber content of from 10% to 40%, by weight. The wet pulp is preferably pasteurized at a temperature of at least 181° F. (83° C.). The wet pulp can be dried or used wet. Drying is preferably accomplished using conventional drying techniques, such as freeze drying, drum drying, tray drying, sun drying, and spray drying. The dried *Morinda citrifolia* pulp preferably has a moisture content in the range from 0.1% to 15%, by weight and a fiber content in the range from 0.% to 30%, by weight.

The *Morinda citrifolia* pulp can be further processed into a high fiber dietary product containing additional ingredients, such as a supplemental dietary fiber, a sweetener, a flavoring agent, coloring agent, and/or a nutritional ingredient.

In another preferred embodiment of the method, a quantity of *Morinda citrifolia* juice and pulp is obtained and pasteurized or enzymatically treated. The juice and pulp mixture is then dried to a moisture content less than about 20%, by weight. The dried juice and pulp contains protein from the *Morinda citrifolia* plant at a concentration typically from 0.1 to 15%, by weight, and fiber at a concentration from 0.1 to 20%, by weight. Additional ingredients are preferably mixed to the dried juice and pulp, such as a supplemental nutritional ingredient with the juice and pulp.

DETAILED DESCRIPTION OF THE INVENTION

The present invention is directed to dietary fiber from the Indian mulberry (*Morinda citrifolia*) plant and to the process of extracting and purifying the fiber. The fiber is obtained as a byproduct of the production of *Morinda citrifolia* juice.

In a currently preferred process of producing *Morinda citrifolia* juice production, the fruit is either hand picked or picked by mechanical equipment. The fruit can be harvested when it is at least one inch (2–3 cm) and up to 12 inches (24–36 cm) in diameter. The fruit preferably has a color ranging from a dark green through a yellow-green up to a white color, and gradations of color in between. The fruit is thoroughly cleaned after harvesting and before any processing occurs.

The fruit is allowed to ripen or age from 0 to 14 days, with most fruit being held from 2 to 3 days. The fruit is ripened or aged by being placed on equipment so it does not contact the ground. It is preferably covered with a cloth or netting material during aging, but can be aged without being covered. When ready for further processing the fruit is light in color, from a light green, light yellow, white or translucent color. The fruit is inspected for spoilage or for excessively green color and hard firmness. Spoiled and hard green fruit is separated from the acceptable fruit.

The ripened and aged fruit is preferably placed in plastic lined containers for further processing and transport. The containers of aged fruit can be held from 0 to 30 days. Most fruit containers are held for 7 to 14 days before processing. The containers can optionally be stored under refrigerated conditions prior to further processing. The fruit is unpacked from the storage containers and is processed through a manual or mechanical separator. The seeds and peel are separated from the juice and pulp.

The juice and pulp can be packaged into containers for storage and transport. Alternatively, the juice and pulp can be immediately processed into finished juice product. The containers can be stored in refrigerated, frozen, or room temperature conditions. The *Morinda citrifolia* juice and puree are preferably blended in a homogenous blend and then mixed with the other ingredients. The other ingredients consist of, but are not limited to water, fruit juice concentrates, flavorings, sweeteners, nutritional ingredients, botanicals, and colorings. The finished juice product is preferably heated and pasteurized at a minimum temperature of 181° F. (83° C.) or higher up to 212° F. (100° C.).

The product is filled and sealed into a final container of plastic, glass, or another suitable material that can withstand the processing temperatures. The containers are maintained at the filling temperature or may be cooled rapidly and then placed in a shipping container. The shipping containers are preferably wrapped with a material and in a manner to maintain or control the temperature of the product in the final containers.

The juice and pulp are further processed by separating the pulp from the juice through filtering equipment. The filtering equipment preferably consists of, but is not limited to, a centrifuge decanter, a screen filter with a size from 1 micron up to 2000 microns, more preferably less than 500 microns, a filter press, reverse osmosis filtration, and any other standard commercial filtration devices. The operating filter pressure preferably ranges from 0.1 psig up to about 1000 psig. The flow rate preferably ranges from 0.1 gpm up to 1000 gpm, and more preferably between 5 and 50 gpm. The wet pulp is washed and filtered at least once and up to 10 times to remove any juice from the pulp. The wet pulp typically has a fiber content of 10% to 40%, by weight. The wet pulp is preferably pasteurized at a temperature of 181° F. (83° C.) minimum and then packed in drums for further processing or made into a high fiber product.

The wet pulp may be further processed by drying. The methods of drying consist of but are not limited to freeze drying, drum drying, tray drying, sun drying, and spray drying. The dried *Morinda citrifolia* pulp preferably has a moisture content in the range from 0.1% to 15%, by weight and more preferably from 5% to 10%, by weight. The dried pulp preferably has a fiber content in the range from 0. 1% to 30%, by weight, and more preferably from 5% to 15%, by weight.

The high fiber product typically includes, but is not limited to, wet or dry *Morinda citrifolia* pulp, supplemental fiber ingredients, water, sweeteners, flavoring agents, coloring agents, and nutritional ingredients. The supplemental fiber ingredients can include, but are not limited to plant based fiber products, either commercially available or developed privately. Examples of some typical fiber products are guar gum, gum arabic, soy bean fiber, oat fiber, pea fiber, fig fiber, citrus pulp sacs, hydroxymethylcellulose, cellulose, seaweed, food grade lumber or wood pulp, hemicellulose, etc. The concentrations of these other fiber raw materials typically ranges from 0% up to 30%, by weight, and more preferably from 10% to 30%, by weight.

Typical sweeteners typically include, but are not limited to, natural sugars derived from corn, sugar beet, sugar cane, potato, tapioca or other starch containing sources that can be chemically or enzymatically converted to crystalline chunks, powders, and/or syrups. Also sweeteners can consist of artificial or high intensity sweeteners, some of which are aspartame, sucralose, stevia, saccharin, etc. The concentration of sweeteners is preferably between from 0% to 50%, by weight, of the formula, and more preferably between about 1% and 5%, by weight. If the sweetener has low sweetening ability, the concentration would be higher.

Typical flavors can include, but are not limited to, artificial and/or natural flavor or ingredients that contribute to flavor such as fruit juice, purees, and concentrates. The concentration of flavors is preferably from 0% up to 15%, by weight, of the formula. Colors preferably include, but are not limited to, food grade artificial or natural coloring agents having a concentration ranging from 0% up to 10%, by weight, of the formula.

Typical nutritional ingredients consist of but are not limited to vitamins, minerals, trace elements, herbs, botanical extracts, bioactive chemicals and compounds at concentrations from 0% up to 10%, by weight. Examples of vitamins one can add to the fiber composition include, but are not limited to, vitamins A, B1 through B12, C, D, E, Folic Acid, Pantothenic Acid, Biotin, etc. Examples of minerals and trace elements one can added to the fiber composition include, but are not limited to, calcium, chromium, copper, cobalt, boron, magnesium, iron, selenium, manganese, molybdenum, potassium, iodine, zinc, phosphorus, etc. Herbs and botanical extracts include, but are not limited, to alfalfa grass, bee pollen, chlorella powder, Dong Quai powder, Echinacea root, Gingko Biloba extract, Horsetail herb, Indian mulberry, Shitake mushroom, spirulina seaweed, grape seed extract, etc. Typical bioactive chemicals can include, but are not limited to, caffeine, ephedrine, L-carnitine, creatine, lycopene, etc.

The juice and pulp can be dried using a variety of methods. The juice and pulp mixture can be pasteurized or enzymatically treated prior to drying. The enzymatic process begins with heating the product to a temperature between 75° F. and 135° F. It is then treated with either a single enzyme or a combination of enzymes. These enzymes include, but are not limited to amylase, lipase, protease, cellulase, bromelin, etc. The juice and pulp can also be dried with other ingredients, such as those described above in connection with the high fiber product. The dried juice and pulp can be used in nutritional products, as a powdered ingredient in other products, or as a product in and of itself The typical nutritional profile of the dried juice and pulp is 1 to 20% moisture, 0.1 to 15% protein, 0.1 to 20% fiber, and the vitamin and mineral content.

The filtered juice and the water from washing the wet pulp are preferably mixed together. The filtered juice is preferably vacuum evaporated to a brix of 40 to 70 and a moisture of 0.1 to 80%, more preferably from 25% to 75%. The resulting concentrated *Morinda citrifolia* juice may or may not be pasteurized. The juice would not be pasteurized in circumstances where the sugar content or water activity was sufficiently low enough to prevent microbial growth. It is packaged for storage, transport and/or further processing. The concentrated *Morinda citrifolia* juice can used in a variety of applications, including, but is not limited to, cosmetics, nutritional products, dietary supplements, as a flavoring, and as a product itself.

EXAMPLES

The following examples are given to illustrate various embodiments which have been made or may be made in accordance with the present invention. These examples are given by way of example only, and it is to be understood that the following examples are not comprehensive or exhaustive of the many types of embodiments of the present invention which can be prepared in accordance with the present invention.

Example 1

A high fiber composition containing *Morinda citrifolia* or Indian mulberry fiber was prepared having the following ingredients:

| Ingredient | Weight (g) |
| --- | --- |
| Citrus pulp sacs | 0.5 |
| Soy fiber | 1.85 |
| Fig powder | 0.01 |
| Guar gum M | 1.35 |
| Gum acacia | 1.34 |
| Chicory root fiber | 1.35 |
| Pea vegetable fiber | 0.5 |
| Oat fiber | 1.8 |
| Barley fiber | 0.25 |
| Oat hull fiber | 0.25 |
| Indian mulberry fiber | 3.0 |

This composition contained about 7.6 grams of dietary fiber.

Example 2

A high fiber composition containing *Morinda citrifolia* or Indian mulberry fiber was prepared having the following ingredients:

| Ingredient | Weight (g) |
|---|---|
| Citrus pulp sacs | 1.5 |
| Soy fiber | 0.85 |
| Fig powder | 0.01 |
| Guar gum M | 1.0 |
| Gum acacia | 1.6 |
| Chicory root fiber | 1.44 |
| Pea vegetable fiber | 0.5 |
| Oat fiber | 1.2 |
| Barley fiber | 0.25 |
| Oat hull fiber | 0.25 |
| Indian mulberry fiber | 3.0 |
| Bamboo fiber | 0.7 |

This composition contained about 7.6 grams of dietary fiber.

Example 3

A high fiber composition containing *Morinda citrifolia* or Indian mulberry fiber and natural sweeteners was prepared having the following ingredients:

| Ingredient | Weight (g) |
|---|---|
| Citrus pulp sacs | 1.2 |
| Soy fiber | 0.75 |
| Fig powder | 1.5 |
| Guar gum M | 1.0 |
| Gum arabic | 1.5 |
| Chicory root fiber | 1.1 |
| Indian mulberry fiber | 3.0 |
| Pea vegetable fiber | 1.0 |
| Oat fiber | 1.05 |
| Fructose | 10 |
| Mixed fruit conc. | 3 |
| Pineapple sweetener | 3 |
| Citric acid | 0.2 |

This composition contained about 7.6 grams of dietary fiber.

Example 4

A high fiber composition containing *Morinda citrifolia* or Indian mulberry fiber and natural sweeteners was prepared having the following ingredients:

| Ingredient | Weight (g) |
|---|---|
| Soy fiber | 0.85 |
| Gum acacia | 1.5 |
| Green pea fiber | 1.1 |
| Oat fiber | 1.2 |
| Fig powder | 0.3 |
| Guar gum | 1.0 |
| Chicory root fiber | 1.2 |
| Citrus fiber | 1.5 |
| GluconoDeltaLactonAcidulant FCC (GDL) ADM | 0.8 |
| Indian mulberry fiber | 3.0 |
| Sucralose | 0.044 |

-continued

| Ingredient | Weight (g) |
|---|---|
| Natural flavor | 2.49 |
| Barley fiber | 0.25 |
| Oat hull fiber | 0.25 |
| Carrageenan Iota | 0.3 |

This composition contained about 7.4 grams of dietary fiber. The composition was combined with 54 grams water to prepare a single serving of a moist high fiber composition suitable for consumption.

Example 5

A high fiber composition containing *Morinda citrifolia* or Indian mulberry fiber and natural sweeteners was prepared having the following ingredients:

| Ingredient | Weight (g) |
|---|---|
| Soy fiber | 1.1 |
| Gum acacia | 1.5 |
| Green pea fiber | 1.2 |
| Oat fiber | 1.3 |
| Fig powder | 0.4 |
| Guar gum | 1.0 |
| Chicory root fiber | 1.2 |
| Citrus fiber | 1.2 |
| GluconoDeltaLactonAcidulant FCC (GDL) ADM | 0.5 |
| Indian mulberry fiber | 3.0 |
| Sucralose | 0.05 |
| Natural flavor | 1.0 |
| Barley fiber | 0.3 |

This composition contained about 7.5 grams of dietary fiber. The composition was combined with 48 grams water to prepare a single serving of a moist high fiber composition suitable for consumption.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

The claimed invention is:

1. A high fiber dietary product comprising: dried juiceless *Morinda citrifolia* fiber separated from other *Morinda citrifolia* fruit components.

2. A high fiber dietary product comprising: *Morinda citrifolia* dried juiceless fiber.

3. The high fiber dietary product of claim 2, wherein the dried juiceless fiber is dried to a moisture content less than 15%, by weight.

4. The high fiber dietary product of claim 2, wherein the dried juiceless fiber is dried to a moisture content from 5% to 10%, by weight.

5. The high fiber dietary product of claim 2, wherein the dried juiceless fiber product has a fiber content of not less than about 5% by weight and a fiber content of not more than about 15% by weight.

6. A high fiber dietary product according to claim 1, further comprising a supplemental dietary fiber, wherein said supplemental dietary fiber is selected from the group consisting of guar gum, gum arabic, soy bean fiber, oat fiber, pea fiber, fig fiber, citrus pulp sacs, hydroxymethylcellulose, cellulose, seaweed, food grade lumber or wood pulp, and hemicellulose.

7. A high fiber dietary product according to claim 6, wherein the supplemental dietary fiber product has a concentration of fiber up to 30%, by weight.

8. A high fiber dietary product according to claim 1, further comprising a sweetener, said sweetener is a natural sweetener selected from natural sugars derived from the group consisting of corn, sugar beet, sugar cane, potato, tapioca or other starch containing sources that can be chemically or enzymatically converted to crystalline chunks, powders, and/or syrups.

9. A high fiber dietary product according to claim 8, comprising up to 50% by weight of said sweetener.

10. A high fiber dietary product according to claim 8, comprising 1% to 5% by weight of said sweetener.

11. A high fiber dietary product according to claim 8, wherein the sweetener is an artificial sweetener selected from the group consisting of aspartame, sucralose, stevia, and saccharin.

12. A high fiber dietary product according to claim 1, further comprising a flavoring agent.

13. A high fiber dietary product according to claim 12, comprising from up to 15% by weight of said flavoring.

14. A high fiber dietary product according to claim 1, further comprising a coloring agent.

15. A high fiber dietary product according to claim 14, comprising up to 10% by weight, of said coloring agent.

16. A high fiber dietary product according to claim 1, further comprising a nutritional ingredient.

17. A high fiber dietary product according to claim 1, further comprising a nutritional ingredient selected from vitamins, minerals, trace elements, herbs, botanical extracts, and bioactive chemicals.

18. A high fiber dietary product according to claim 17, comprising up to 10% by weight of said nutritional ingredient.

19. A high fiber dietary product according to claim 17, wherein the vitamins are selected from the group consisting of vitamin A, vitamin B1 through vitamin B12, vitamin C, vitamin D, vitamin E, folic acid, pantothenic acid, and biotin.

20. A high fiber dietary product according to claim 17, wherein the minerals and trace elements are selected from the group consisting of calcium, chromium, copper, cobalt, boron, magnesium, iron, selenium, manganese, molybdenum, potassium, iodine, zinc, and phosphorus.

21. A high fiber dietary product according to claim 17, wherein the herbs and botanical extracts are selected from the group consisting of alfalfa grass, bee pollen, chlorella powder, Dong Quai powder, Echinacea root, Gingko Biloba extract, Horsetail herb, Indian mulberry, Shitake mushroom, spirulina seaweed, and grape seed extract.

22. A high fiber dietary product according to claim 17, wherein the bioactive chemicals are selected from the group consisting of caffeine, ephedrine, L-carnitine, creatine, and lycopene.

* * * * *